United States Patent
Pierson

(10) Patent No.: US 9,419,468 B1
(45) Date of Patent: Aug. 16, 2016

(54) INDUCTIVE CHARGING SYSTEM

(71) Applicant: Amazon Technologies, Inc., Reno, NV (US)

(72) Inventor: Andrew Michael Pierson, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 431 days.

(21) Appl. No.: 14/136,707

(22) Filed: Dec. 20, 2013

(51) Int. Cl.
*H02J 7/00* (2006.01)
*H02J 7/02* (2016.01)

(52) U.S. Cl.
CPC ..................... *H02J 7/025* (2013.01)

(58) Field of Classification Search
CPC ........................................ H02J 7/025
USPC ................................. 320/108, 137
See application file for complete search history.

(56) References Cited

U.S. PATENT DOCUMENTS

| | | | | |
|---|---|---|---|---|
| 5,850,135 A | * | 12/1998 | Kuki | B60L 11/1805 320/108 |
| 5,923,544 A | * | 7/1999 | Urano | H02J 7/025 307/104 |
| 6,127,800 A | * | 10/2000 | Kuki | B60L 11/182 320/108 |

* cited by examiner

*Primary Examiner* — Nathaniel Pelton
(74) *Attorney, Agent, or Firm* — Lee & Hayes, PLLC

(57) ABSTRACT

An example inductive charging system includes a housing including a first wall and a second wall opposite the first wall. The first and second walls at least partially form a channel extending along an external length of the housing. The system also includes an inductive charging coil disposed within the housing. The charging coil includes a substantially annular central axis and a wire wrapped in a spiral configuration circumferentially around the central axis. The charging coil includes a first end disposed proximate the first wall, and a second end substantially facing the first end and disposed proximate the second wall. The charging coil is positioned such that the channel passes through a gap extending from the first end to the second end.

19 Claims, 6 Drawing Sheets

INDUCTIVE CHARGING SYSTEM

BACKGROUND

A large and growing population of users is using a varying array of electronic devices to accomplish daily tasks. These electronic devices include mobile phones or smartphones, electronic book reader devices, desktop computers, laptop computers, personal digital assistants (PDAs), tablet computing devices, and the like. These devices typically include one or more rechargeable batteries configured to facilitate short-term use of the device. Depending on the capacity of such batteries, and the usage of the device, the batteries may need to be recharged frequently.

Most electronic devices are configured to enable recharging of the batteries by connecting a first end of a power cord to the device while a second end of the power cord is connected to a wall outlet or other like power source. Alternatively, some electronic devices are configured to enable recharging of the batteries via a wireless charging system. Wireless charging systems can be improved.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
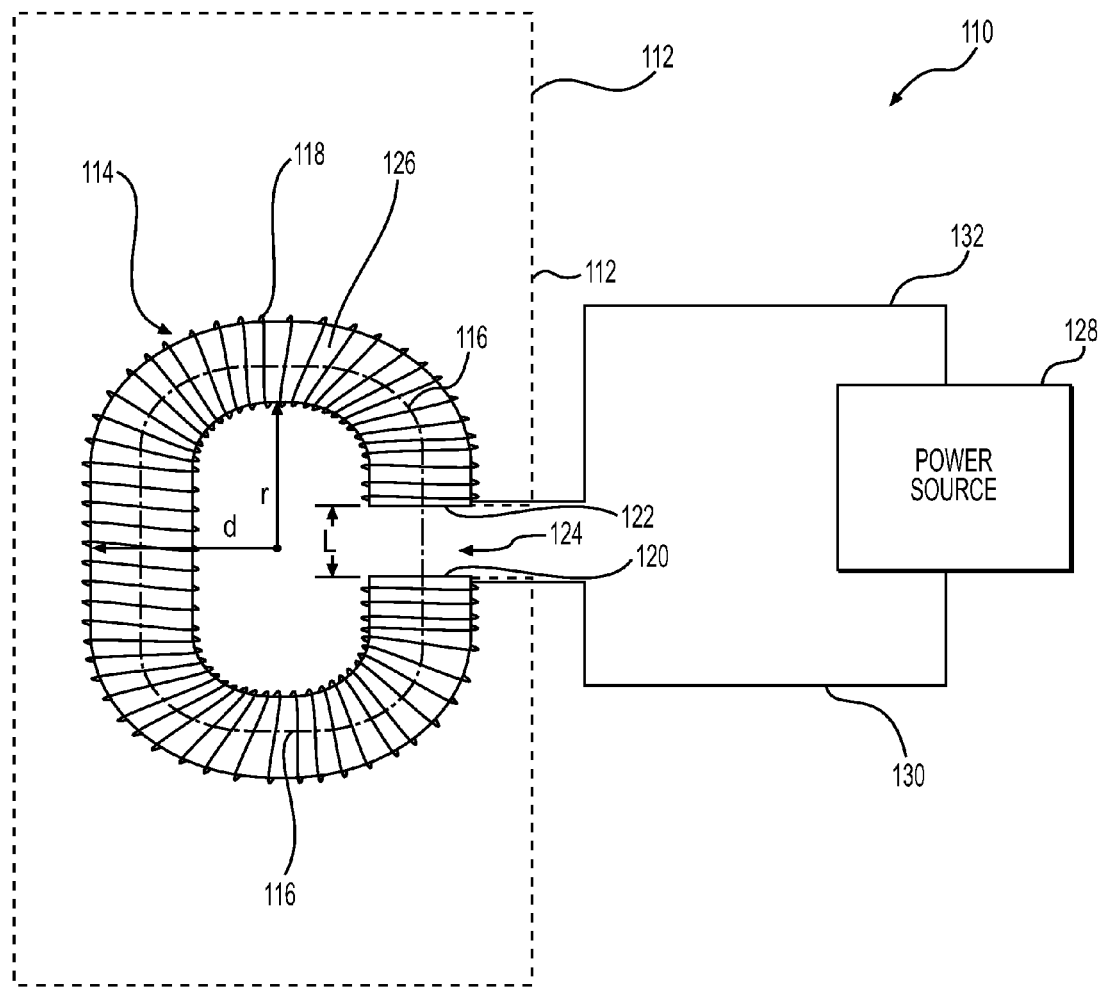
FIG. 1 illustrates an example inductive charging system.

This disclosure describes systems, devices, methods, and processes (collectively "techniques") for inductively charging a rechargeable power supply of an electronic device. The claimed techniques are described below with reference to an example inductive charging system. However, it is to be appreciated that a number of other inductive charging systems may also employ these techniques.

An example inductive charging system of the present disclosure includes a housing, and an inductive charging coil disposed within the housing. The charging coil may have any of a number of configurations useful in generating an electromagnetic field, and in particular, such configurations may contribute to focusing such an electromagnetic field generated between ends of the charging coil. For example, the charging coil may be substantially annular in shape. In such an embodiment, the charging coil may include a first end, and a second end substantially facing the first end. For example, the inductive charging coil may be C-shaped (e.g., form an angle between approximately 290 degrees and approximately 355 degrees), and may include a gap extending from the first end to the second end. In such an embodiment, an electromagnetic field generated by the charging coil may be characterized by flux lines extending from the first end to the second end via the gap. It is further understood that a wire or other structure forming the inductive charging coils of the present disclosure may not necessarily terminate at the first and second ends of the inductive charging coil. Instead, such a wire may form the first and second ends, and may also extend from one or both of the first and second ends to one or more power sources or other components of the inductive charging system. For example, respective leads may be formed by the wire, and such leads may extend from the first and second ends of the inductive charging coil to one or more power sources or other components of the inductive charging system. In still further embodiments, one or more such leads may be soldered and/or otherwise operably connected to the wire at a respective end of the inductive charging coil.

In an embodiment, the inductive charging coil may include a substantially annular central axis. In such embodiments, the central axis may extend longitudinally through the center of the charging coil, and may extend through the gap from the first end to the second end. The inductive charging coil may also include a wire wrapped in a spiral configuration circumferentially around the central axis. In such an embodiment, the configuration of the wire may affect the characteristics of the electromagnetic field generated by the charging coil. For example, increasing the number of winds or loops of the wire about the central axis may result in a corresponding increase in the flux of the electromagnetic field within the gap. It is understood that other characteristics of the inductive charging coil may also affect the characteristics of the electromagnetic field. For example, the charging coil may be configured so as to minimize the height of the gap (i.e., the distance along the central axis between the first end of the charging coil and the second end of the coil). Minimizing the height of the gap may also result in a corresponding increase in the flux of the electromagnetic field within the gap.

In an embodiment, the inductive charging coil may be operably connected to a power source. The power source may be configured to direct electrical current to the charging coil to generate the electromagnetic field within the gap. For example, the inductive charging system may include a first lead connected to the wire at the first end of the charging coil and a second lead connected to the wire at the second end of the charging coil. Accordingly, the inductive charging coil may be selectively energized by the power source to generate the electromagnetic field. In some embodiments, in response to receiving electrical current from the power source, the charging coil may form a first magnetic pole, having a first polarity, at the first end, and a second magnetic pole, having a second polarity opposite the first polarity, at the second end. In such an example embodiment, flux of the electromagnetic field may pass from the first magnetic pole to the second magnetic pole within the gap. Additionally, such a configuration may assist in concentrating the electromagnetic field within the gap such that the loss of such flux is minimized.

The housing of the inductive charging system may have any configuration configured to assist in concentrating the electromagnetic field within the gap and in minimizing flux losses associated there with. For example, the housing may include one or more channels configured to support an electronic device proximate the gap. In particular, the housing may be configured such that disposing the electronic device at least partially within the channel may position a secondary inductive coil of the electronic device substantially within the gap. Electrical current may then be directed to the inductive charging coil to generate an electromagnetic field within the gap, and the electromagnetic field may induce electrical current in the secondary inductive coil of the electronic device. The electrical current induced in the secondary inductive coil may be directed to a rechargeable power supply of the electronic device operably connected to the secondary inductive coil, thereby recharging the rechargeable power supply.

In an example embodiment, the housing may include a first wall, a second wall opposite the first wall, and a third wall extending from the first wall to the second wall. In such an embodiment, the first, second, and third walls of the housing may form the channel, and the channel may extend along an external surface of the housing. As a result, the channel may be easily accessible by users of the electronic device wishing to recharge the rechargeable power supply thereof. In example embodiments, at least one of the first, second, and third walls forming the channel may include a portion configured to support the electronic device thereon. In such an embodiment, the wall having such a portion may include an alignment key indicative of a location on the first wall corresponding to, for example, the location of the gap formed by the inductive charging coil. For example, the alignment key may be indicative of a location corresponding to the electromagnetic field selectively generated by the inductive charging coil. In such an embodiment, aligning the electronic device with the alignment key may dispose the secondary inductive coil of the electronic device substantially within the gap. As a result, when the inductive charging coil is selectively energized to generate the electromagnetic field within the gap, the secondary inductive coil may be disposed within the electromagnetic field to facilitate inductively charging the rechargeable power supply of the electronic device.

As noted above, the inductive charging coil may be disposed within the housing of the various inductive charging systems described herein. In such embodiments, the inductive charging coil may be positioned such that the first end thereof may be disposed adjacent and/or otherwise proximate the first wall internal to the housing, and the second end substantially facing the first end may be disposed adjacent and/or otherwise proximate the second wall internal to the housing. In such an embodiment, the inductive charging coil may substantially surround the channel from within the housing such that the channel passes through the gap spacing the first end from the second end. As noted above, the height of the gap, and a corresponding height of the channel may be minimized in order to maximize the flux passing through the gap. Maximizing the flux passing through the gap in this way may correspondingly maximize the efficiency with which the rechargeable power supply of the electronic device may be recharged.

FIG. 1 illustrates an example inductive charging system 110 of the present disclosure. As shown in FIG. 1, an example inductive charging system 110 may include a housing 112 and an inductive charging coil 114 disposed within the housing 112. The inductive charging coil 114 may be selectively energized upon receipt of electrical current to generate an electromagnetic field, and the charging coil 114 may have any of a number of configurations useful in generating the electromagnetic field.

For example, the charging coil 114 may be curved, substantially C-shaped, substantially rounded, and/or otherwise substantially annular in shape. The charging coil 114 may include a longitudinal central axis 116 extending centrally therethrough, and a wire 118 wrapped in a spiral configuration circumferentially around the central axis 116. In embodiments in which the inductive charging coil 114 is curved, substantially C-shaped, substantially rounded, and/or otherwise substantially annular in shape, the corresponding central axis 116 thereof may also be curved, substantially C-shaped, substantially rounded, and/or otherwise substantially annular in shape. In an example embodiment, the charging coil 114 may also include a first end 120 and a second end 122 substantially facing the first end 120. In particular, the first end 120 may be spaced from the second end 122 by a gap 124 extending from the first end 120 to the second end 122. Upon receiving electrical current, the charging coil 114 may be configured to generate an electromagnetic field within the gap 124. As will be described in greater detail below, such an electromagnetic field may be characterized by flux lines extending from the first end 120 of the charging coil 114 to the second end 122 via the gap 124. Additionally, in response to receiving electrical current the charging coil 114 may form a first magnetic pole, having a first polarity, at the first end 120, and a second magnetic pole, having a second polarity opposite the first polarity, at the second end 122. In an example embodiment, the first magnetic pole may have a North (N) polarity and the second magnetic pole having a South (S) polarity, but in other embodiments, the respective polarity of the first and second magnetic poles may be switched by reversing the direction of electrical current directed to the charging coil 114. It is also understood that when directing alternating current to the charging coil 114, such magnetic poles may substantially continuously alternate with the polarity of the current.

As noted above, the various configurations of the charging coil 114 may be selected to maximize the flux passing through the gap 124 from the first end 120 to the second end 122, and to thereby optimize operation of the inductive charging system 110. For example, the charging coil 114 may have any desired radius r, diameter d, and/or other configuration selected to maximize the flux passing within the gap 124 when the charging coil 114 is energized. Additionally, any desired number of winds or loops of the wire 118 may be chosen to affect a desired intensity of the electromagnetic field. Similarly, the gap 124 may have any height L configured to maximize the flux passing through the gap 124. In an example embodiment, the diameter d of the charging coil 114 may be between approximately 3 inches and approximately 4 inches, and the radius r of the charging coil 114 may be between approximately 2 inches and approximately 3 inches. In such embodiments, a width F of the charging coil 114 (FIG. 3) may be equal to approximately 1 inch. Additionally, in an example embodiment the height L of the gap 124 may be between approximately 0.5 inches and approximately 1 inch. The dimensions of the radius r, diameter d, width F, height L, and other components of the charging coil 114 described herein are merely examples, and in additional embodiments, such dimensions may be greater than or less than those listed above.

Additionally, various configurations of the charging coil 114 may be interrelated such that modifying a first characteristic in conjunction with modifying a second characteristic may achieve a desired effect on the resulting electromagnetic field. For example, reducing the diameter d of the charging coil 114 while maintaining the radius r constant, or while increasing the radius r, may have the effect of increasing the amount of flux that the charging coil 114 is capable of directing through the gap 124. Additionally, reducing the height L of the gap 124 may have the effect of reducing the amount of flux lost during generation of the electromagnetic field. Thus, minimizing the height L of the gap 124 may increase the efficiency of the charging coil 114 and may optimize operation of the inductive charging system 110. Moreover, increasing the number of loops of the wire 118 circumferentially about the central axis 116 may have the effect of increasing the amount of flux that the charging coil 114 is capable of directing through the gap 124. It is understood that further modifications to the configuration of the charging coil 114 may have additional effects on the electromagnetic field generated thereby as is known in the art. Further, it is understood that in further embodiments the charging coil 114 may be substantially square, substantially elliptical, substantially triangular, substantially rectangular, substantially pentagonal, substantially hexagonal, and/or any other polygonal or other like shape. In one or more such embodiments, the radius r, diameter d, and/or other configurations of the charging coil 114 described above may not be applicable. Further, in such embodiments, a corresponding central axis 116 of the inductive charging coil 114 may be substantially square, substantially elliptical, substantially triangular, substantially rectangular, substantially pentagonal, substantially hexagonal, and/or any other polygonal or other like shape.

In an example embodiment, the charging coil 114 may include a central core 126. In such an embodiment, the wire 118 may be wrapped circumferentially around the core 126 and the central axis 116 may extend substantially centrally through the core 126. The core 126 may be made from any magnetic or nonmagnetic material known in the art. In example embodiments in which the core 126 is made from a magnetic material, the core 126 may assist in focusing the electromagnetic field within the gap 124. In such embodiments, the core may be made from, for example, iron, copper, and/or other like magnetic metals and/or alloys. Additionally, in such embodiments, the first and second ends 120, 122 may be formed by respective ends of the core 126. In such embodiments, the core 126 may assist in shaping the inductive charging coil 114 and/or the wire 118. For example, in embodiments in which the charging coil 114 includes a core 126, the wire 118 may be formed, in a spiral configuration, circumferentially around an outer surface of the core 126. In further embodiments, on the other hand, the core 126 may be omitted.

In an example embodiment, the inductive charging system 110 may include and/or may be connectable to a power source 128. For example, the charging coil 114 may be operably connectable to a power source 128 external to the housing 112. The power source 128 may comprise any known alternating current or direct current power source known in the art. For example, the power source 128 may comprise one or more direct current batteries operably connected to the charging coil 114. Alternatively, the power source 128 may comprise a wall outlet or other like alternating current source. The power source 128 may be configured to direct electrical current to the charging coil 114 at any desired voltage to facilitate forming the electromagnetic field within the gap 124. As shown in FIG. 1, the charging coil 114 may be operably connected to the power source 128 via a first lead 130 and a second lead 132. In such an embodiment, the first lead 130 may be formed by and/or otherwise connected to the wire 118 at the first end 120 of the charging coil 114, and the second lead 132 may be formed by and/or otherwise connected to the wire 118 at the second end 122.

Figure 2:
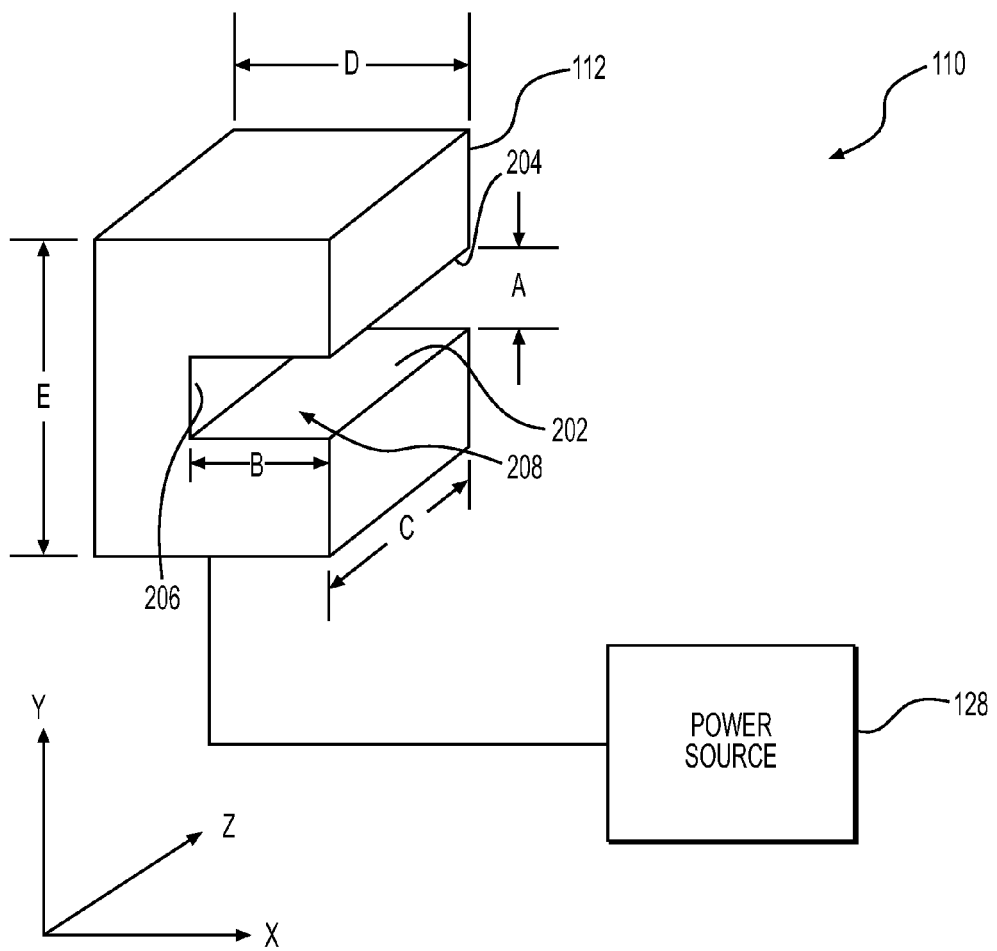
FIG. 2 illustrates a housing of the inductive charging system shown in FIG. 1.

As shown in FIG. 2, the housing 112 may be substantially cube-shaped and/or any other shape known in the art. For example, the housing 112 may include a plurality of walls forming respective external and/or internal surfaces of the housing 112. In particular, the housing 112 may be characterized by any length C, width D, and/or height E useful in substantially surrounding the charging coil 114 and the gap 124 formed thereby. In an embodiment, the housing 112 may include a first wall 202, a second wall 204 opposite the first wall 202, and a third wall 206 extending from the first wall 202 to the second wall 204. In such an embodiment, the first, second, and third walls 202, 204, 206 may each comprise external surfaces of the housing 112, and such walls 202, 204, 206 may form a channel 208 extending along an external length C of the housing 112. In an example embodiment, the channel 208 may extend along at least a portion of the external length C, and in other embodiments, the channel 208 may extend along substantially the entire external length C of the housing 112. The channel 208 may have any shape, size, length, width, height, and/or other configuration of known in the art. For example, the channel 208 may have a longitudinal cross-section that is substantially square-shaped, substantially rectangular-shaped, and/or any other shape known in the art. The channel 208 may also have any length C, width B, and height A useful in supporting at least a portion of an electronic device therein. Additionally, the height A of the channel 208 may be commensurate and/or substantially equal to the height L of the gap 124 to assist in maximizing the flux passing through the gap 124. For example, the first wall 202 may extend substantially parallel to the second wall 204, and the first wall 202 may be separated from the second wall 204 by the third wall 206 of the housing 112. In this configuration, the third wall 206 may define the height A of the channel 208 and may form at least a portion of the channel 208. For example, the third wall 206 may extend along at least a portion of the external length C of the housing 112 and may form a corresponding length of the channel 208. In some embodiments, the third wall 206 and/or the channel 208 may not extend along the entire length C of the housing 112. Further, in such a configuration the charging coil 114 may be positioned within the housing 112 such that the third wall 206 is disposed radially inward of the gap 124. In such embodiments, an example radial direction may be defined by the X-Y plane shown in FIG. 2, and in particular, such a radial direction may be any direction along the X-axis, the Y-axis, and/or any other axis of the inductive charging coil 114 defined by the X-Y plane. For example, as noted above with respect to FIG. 1, the inductive charging coil may include a radius r and a diameter d. The radius r and diameter d may be defined by the X-Y plane, and may be measured from a common central point radially inward of the gap 124. In such embodiments, a third wall 206 of the housing 112 disposed "radially inward" of the gap 124 may be disposed at a location along the radius r of the inductive charging coil 114.

As shown in FIG. 2, the housing 112 may be oriented such that the first and second walls 202, 204 of the channel 208 extend substantially horizontally (i.e., in the X-Z plane), and the third wall 206 extends substantially vertically (i.e., in the Y-Z plane). It is understood, however, that in alternate embodiments, the housing 112 may be positioned in any other orientation known in the art. For example, in an alternate embodiment the housing 112 may be oriented such that the first and second walls 202, 204 of the channel 208 extend substantially vertically (i.e., in the Y-Z plane), and that the third wall 206 extends substantially horizontally (i.e., in the X-Z plane).

Figure 3:
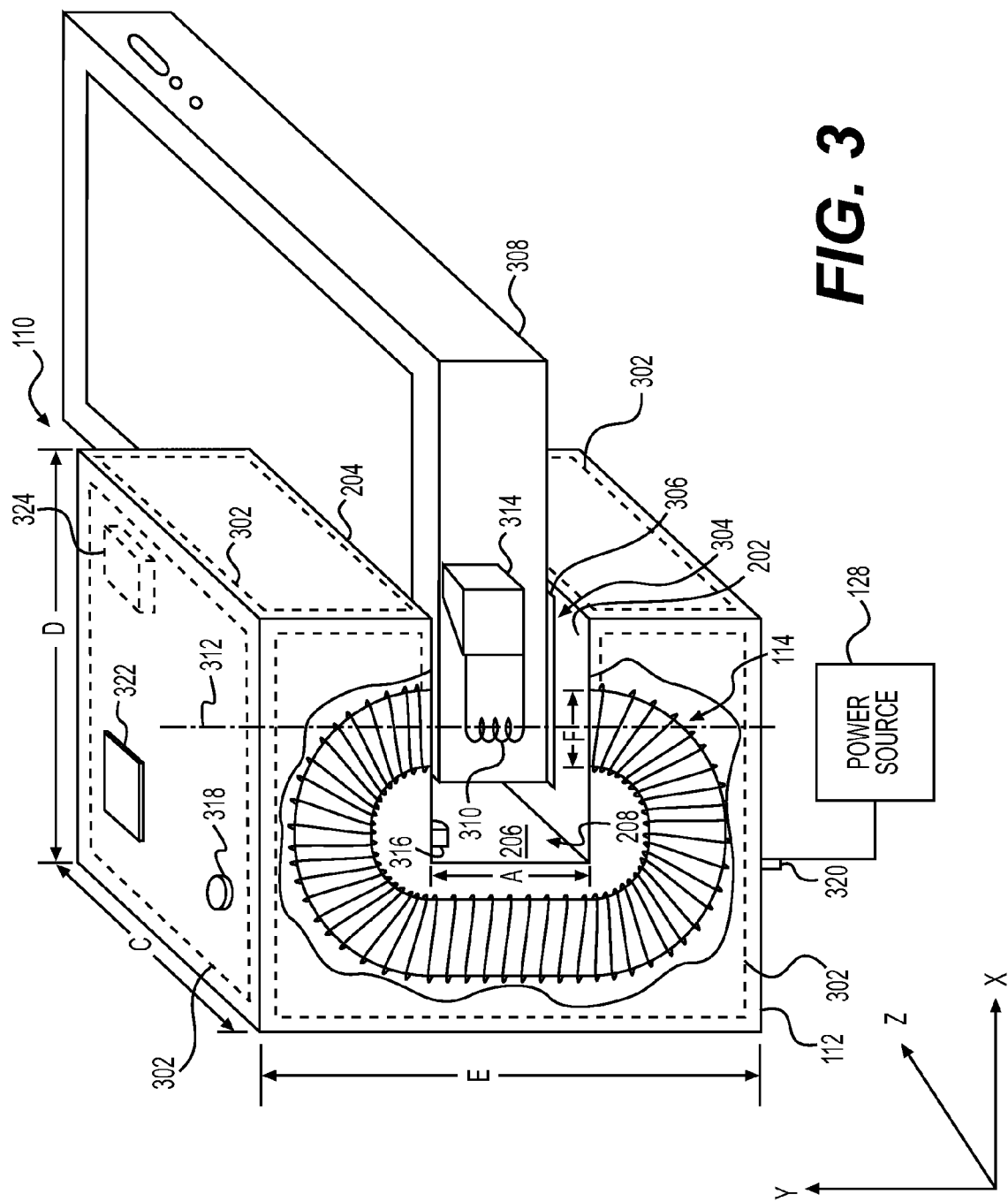
FIG. 3 illustrates an example electronic device supported on a wall of the housing shown in FIG. 2.

As shown in FIG. 3, one or more walls of the housing 112 may include shielding material 302 configured to substantially prohibit flux from an electromagnetic field, RF energy, or other like interference from entering and/or exiting the housing 112. For example, such shielding material 302 may include any metal, alloy, or other like material that is substantially reflective and/or otherwise opaque to such interference. Such shielding material 302 may also substantially prohibit flux from the electromagnetic field generated by the inductive charging coil 114 from exiting the housing 112 via the various walls of the housing including the shielding material 302. For example, each of the walls of the housing 112, except for at least one of the first, second, and third walls 202, 204, 206 forming the channel 208, may include such shielding material 302 such that the generated electromagnetic field is only permitted to pass through the channel 208, such as between the first and second walls 202, 204 (i.e., from the first end 120 to the second end 122 via the first and second walls 202, 204). Thus, the shielding material 302 may assist in directing the electromagnetic field generated by the charging coil 114 from, for example, the first wall 202 to the second wall 204, and the first and second walls may be configured without the shielding material 302 for at least this purpose. In an example embodiment, the shielding material 302 may be disposed on an internal surface and/or on an external surface of the various walls of the housing 112. In such an embodiment, the shielding material 302 may be adhered, bolted, clipped, welded, and/or otherwise coupled to such housing walls. In still further embodiments, one or more walls of the housing 112 may be made from such shielding material 302, and the shielding material 302 may be integral with such housing walls.

Further, one or more of the walls 202, 204, 206 forming the channel 208 of the housing 112 may include a portion configured to support an electronic device thereon. For example, as shown in FIG. 3, in an example embodiment, the housing 112 may include a cavity or other like internal portion within (i.e., internal to) the housing 112, and the charging coil 114 may be disposed within the internal portion, internal to the housing 112. Such an internal portion may be defined by one or more internal walls, surfaces, platforms, shoulders, or other internal structures of the housing 112, and may be configured to support and/or house the charging coil 114 therein. For example, the internal portion may be formed by internal surfaces of at least one of the first, second, and/or third walls 202, 204, 206, and the internal portion may be completely internal to the housing 112. Further, the first wall 202 may include a portion 304 configured to at least partially support an electronic device thereon. In such embodiments, the portion 304 of the first wall 202 may comprise a substantially planar, substantially horizontal portion of the first wall 202. In an example embodiment, at least part of the portion 304 may be positioned such that the gap 124 (FIG. 1) of the charging coil 114 substantially surrounds and/or otherwise overlays the portion 304 of the first wall 202. For example, at least part of the portion 304 may be disposed within the gap 124. Further, at least part of the portion 304 may be disposed between the first end 120 and the second end 122. In such an embodiment, flux lines of the electromagnetic field generated by the charging coil 114 may extend between the first wall 202 and the second wall 204 via the portion 304 of the first wall 202.

In an example embodiment, the portion 304 of the first wall 202 may include one or more alignment keys 306 indicative of a location on the first wall 202 corresponding to the electromagnetic field and, in particular, to a location on the first wall 202 through which flux lines of the electromagnetic field may pass and/or may otherwise be concentrated. Such alignment keys 306 may comprise, for example, visual, tactile, magnetic, structural, and/or other like indicia corresponding to the electromagnetic field. For example, such alignment keys 306 may include one or more lines, grids, markers, grooves, knurled portions, and/or other like alignment guides. Such alignment keys 306 may be visible by a user of the inductive charging system 110 to assist in aligning an electronic device 308 with the electromagnetic field within the channel 208. Additional alignment keys 306 may include one or more shoulders, knobs, ridges, projections or other like structures extending from the first, second, and/or third wall 202, 204, 206. Such alignment keys 306 may enable the user to align the electronic device 308 with the electromagnetic field by abutting a side, back, and/or other surface of the electronic device 308 against one or more such alignment keys 306. In such embodiments, the first, second, and/or third wall 202, 204, 206 of the housing 112 may be curved, contoured, substantially planar, and/or otherwise configured to assist with aligning the electronic device 308, and in such embodiments, one or more of the first, second, and/or third walls 202, 204, 206 in its entirety, may act as an alignment key 306. Further alignment keys 306 may include one or more permanent magnets or other like magnetic structures configured to attract and/or repel components of the electronic device 308. Such alignment keys 306 may assist the user in aligning the electronic device 308 relative to the channel 208, and/or the electromagnetic field selectively generated by the inductive charging coil 114, by exerting a magnetic force on one or more components of the electronic device 308. Such a magnetic force may be felt by the user while the user positions the electronic device 308 within the channel 208, and may, thus, assist the user in aligning the electronic device 308.

In an example embodiment, the housing 112 may be configured to assist in recharging a variety of different electronic devices 308, each having a different shape, size, battery capacity, and/or other configuration. In such an embodiment, the portion 304 of the first wall 202 may include a plurality of alignment keys 306, and each alignment key 306 may correspond to a respective electronic device 308 having a unique/different size, shape, and/or other configuration. In such embodiments, aligning the respective electronic device 308 with its corresponding alignment key 306 may dispose a secondary inductive coil 310 of the electronic device 308 within the electromagnetic field generated by the inductive charging coil 114.

As shown in FIG. 3, an example secondary inductive coil 310 may comprise a substantially spiral-shaped coil of wire disposed internal to the electronic device 308. The secondary inductive coil 310 may include, for example, a longitudinal axis 312 extending substantially centrally therethrough, and the secondary inductive coil 310 may be wrapped in a spiral configuration circumferentially around the longitudinal axis 312. In an example embodiment, disposing the electronic device 308 within the channel 208 such that at least a portion of the electronic device 308 is supported by the portion 304 may orient the secondary inductive coil 310 such that the secondary inductive coil 310 is substantially aligned with flux lines of the electromagnetic field generated by the charging coil 114. For example, positioning the electronic device 308 such that a side and/or a corner of the electronic device 308 is disposed adjacent, substantially parallel to, and/or proximate one or more respective alignment keys 306 may dispose the secondary inductive coil 310 substantially within the gap 124 (FIG. 1) of the charging coil 114. Positioning the electronic device 308 in this way may also orient, dispose, and/or otherwise position the longitudinal axis 312 of the secondary inductive coil 310 substantially parallel to and/or substantially tangent to the central axis 116 of the charging coil 114 within the gap 124. Further, it is understood that positioning the electronic device 308 in this way may dispose the secondary inductive coil 310 substantially above and within a cross-sectional area of the charging coil 114 disposed in the X-Z plane. When positioned in this way, the longitudinal axis 312 of the secondary inductive coil 310 may be adjacent, substantially collinear with, and/or otherwise proximate at least a portion of the central axis 116 of the charging coil 114 within the gap 124. As a result, the electromagnetic field generated by the charging coil 114 may efficiently induce electrical current in the secondary inductive coil 310.

The electronic device 308 may comprise a desktop computer, a laptop computer, a tablet, a pad, a smartphone, a personal digital assistant (PDA), and the like, as well as any other type of handheld or small, light-weight, portable device upon which electronic or other content can be rendered and conveniently viewed. In some embodiments, the electronic device 308 may comprise a flat-form device such as a smartphone or a dedicated-purpose electronic book reader device, having a flat-panel display and other like components. In an example embodiment, the electronic device 308 may have networking capabilities. For example, the electronic device 308 may have a wireless communication interface that allows communication though a network (not shown). The wireless communication interface may utilize WiFi, cellular, or other wireless data and networking technologies. The network may be any type of communication network, including a local-area network, a wide-area network, the Internet, a wireless network, a wide-area network (WWAN), a cable television network, a telephone network, a cellular communications network, or combinations of the foregoing.

In example embodiments, the charging coil 114 may be optimized and/or otherwise configured to transmit energy to the secondary inductive coil 310 at a particular given frequency. In such embodiments, the charging coil 114 may also be optimized and/or otherwise configured to transmit information to components of the electronic device 308, additional electronic devices, and/or other local or remote devices at an additional frequency different than such a given frequency. In such embodiments, for example, the charging coil 114 may be configured to both send and receive signals at the additional frequency. The charging coil 114 may thereby facilitate bi-directional communication, via the additional frequency, with the electronic device 308 and/or with additional devices. In one example, the charging coil 114 may receive one or more signals from the electronic device 308, via the additional frequency, indicating a charge level of one or more rechargeable power supplies (discussed in greater detail below) operably connected to the secondary inductive coil 310. The charging coil 114 may also connect to one or more of the networks described herein via the additional frequency. Moreover, the electronic device 308 may send audio, video, and/or other like content to the charging coil 114 via the additional frequency. In such an embodiment, the housing 112 may include one or more speakers, displays, or other like operator interfaces by which such content may be viewed, heard, and/or otherwise consumed by the user. In still further embodiments, information received by the charging coil 114 via the additional frequency may be sent to a cloud networking service, or to one or more of the above networks. In such embodiments, the housing 112 and/or the charging coil 114 may be used as a router as known in the art.

In example embodiments, the electronic device 308 may also include non-volatile storage capabilities so that electronic content items can be downloaded and stored in their entirety on the electronic device 308. In some instances, once such content items have been stored on the electronic device 308, such content items can be displayed and/or otherwise consumed at any time, whether or not the electronic device 308 is connected to a network. In other embodiments, meanwhile, the electronic device 308 may stream or otherwise receive content items on-demand.

In one configuration, the electronic device 308 includes one or more processors and memory (not shown). Depending on the configuration of the electronic device 308, the memory may be a type of computer storage media and may include volatile and nonvolatile memory. Thus, the memory may include, but is not limited to, RAM, ROM, EEPROM, flash memory, or other memory technology, or any other medium which can be used to store media items or applications and data which can be accessed by the electronic device 308. The memory may be used to store any number of functional components that are executable on the processors. In many embodiments, these functional components comprise instructions or programs that are executable by the processors and that implement operational logic for performing the actions attributed above to the electronic device 308. In addition, the memory may store various types of data that are referenced by executable programs. Furthermore, it is noted that while the components described herein are illustrated as residing on the electronic device 308, in some embodiments some or all of these components may reside remote from the electronic device 308. For instance, some or all of these components may reside on a remote server that may perform various operations associated with the electronic device 308.

The electronic device 308 may also include a rechargeable power supply 314 operably connected to the secondary inductive coil 310. The power supply 314 may comprise any rechargeable source of power commonly associated with the electronic devices 308 described herein. For example, the rechargeable power supply 314 may include one or more rechargeable batteries, such as, for example, nickel cadmium (NiCd) batteries, nickel metal hydride (NiMH) batteries, lithium ion (Li-ion) batteries, lithium ion polymer (Li-ion polymer) batteries, and the like. Such batteries may have any capacity and/or voltage rating known in the art sufficient for rechargeably powering the electronic device 308.

In an example embodiment, the inductive charging system 110 may include one or more sensors 316 configured to detect the presence and/or location of the electronic device 308. For example, the sensors 316 may comprise one or more photo diodes, proximity sensors, cameras, and/or other like sensing devices configured to determine whether and/or when the electronic device 308 is positioned within the channel 208. Additionally, one or more of the sensors 316 may comprise an emitter configured to emit a beam of light or other like radiation in the visible or thermal band. In such an embodiment, one or more of the sensors 316 may comprise a receiver configured to receive the emitted beam. The emitter and the receiver may be positioned proximate and/or within the channel 208 such that disposing the electronic device 308 at least partially within the channel 208 may inhibit the receiver from receiving the emitted beam, thereby triggering the sensor 316 to indicate the presence of the electronic device 308. In an example embodiment, the sensors 316 may be disposed proximate, within, and/or on at least one of the walls 202, 204, 206 forming the channel 208. For example, the one or more sensors 316 may be positioned and/or otherwise configured to determine the position of the electronic device 308 within the channel 208 and/or relative to the alignment keys 306. In such embodiments, the sensors 316 may be configured to assist in indicating to a user of the inductive charging system 110 when the electronic device 308 has been properly positioned within the channel 208 and/or relative to the charging coil 114.

With continued reference to FIG. 3, the inductive charging system 110 may also include one or more controls 318 configured to control various operations of the inductive charging system 110. For example, one or more of the controls 318 may comprise a switch, button, dial, knob, lever, touchscreen, and/or other like device operably connected to the power source 128 and/or the charging coil 114. In such an embodiment, the one or more controls 318 may comprise an on/off control configured to energize or de-energize the charging coil 114. In further embodiments, the one or more controls 318 may comprise a dial, knob, and/or other like device configured to control the amount of current directed to the charging coil 114 and/or to otherwise control the resulting intensity, strength, flux, and/or other characteristics of the electromagnetic field generated by the charging coil 114.

In an example embodiment, the inductive charging system 110 may also include one or more sensors 320 operably connected to the power source 128 and/or the charging coil 114. Such sensors 320 may be configured to sense, monitor, and/or otherwise determine the amount of current directed to the charging coil 114. Such sensors 320 may also be configured to sense and/or otherwise determine the level of charge within the power supply 314. In such embodiments, the sensors 320 may be configured to determine when the power supply 314 is fully-charged and/or whether additional power and/or current is required to recharge the power supply 314. In an example embodiment, the one or more sensors 320 may be a component of the housing 112, and in some embodiments, the one or more sensors 320 may be disposed at least partially internal to the housing 112.

As shown in FIG. 3, the inductive charging system 110 may also include one or more displays 322 configured to provide information to a user of the inductive charging system 110. For example, the display 322 may comprise a liquid crystal display, a touchscreen, a light-emitting diode readout, and/or other like device configured to convey information in the form of text, graphics, or a combination thereof. The display 322 may be configured to provide indications of, for example, whether the charging coil 114 is energized, the level of current being directed to the charging coil 114, the level of charge of the power supply 314, the presence of the electronic device 308 within the channel 208, the location of the electronic device 308 within the channel 208 and/or relative to the alignment keys 306, and/or other like information. Such information may be provided by, for example, one or more of the sensors 316, 320 and/or controls 318 described herein. In further embodiments, the inductive charging system 110 may also include one or more speakers, alarms, or other like devices (not shown) configured to provide audible indicia or other like information to the user.

In further embodiments, the display 322, speakers, and/or other components of the inductive charging system 110 may be configured to output content transferred to the housing 112 by the electronic device 308. For example, the display 322 and/or the speakers may be configured to output audio, video, and/or other content transmitted to the charging coil 114 and/or other components of the inductive charging system 110. As noted above, such content and/or other like information may be transferred to the charging coil 114 via one or more frequencies, and such frequencies may be different than a particular frequency via which power is transmitted to the secondary inductive coil 310. In still other embodiments, the electronic device 308 may output such content and/or other like information, either alone and/or in combination with the components of the housing 112, while the electronic device 308 is disposed substantially within the channel 208.

The inductive charging system 110 may further include one or more processors 324 and a memory (not shown) operably connected thereto. The processors 324 may be operably connected to the charging coil 114, the sensors 316, 320, the controls 318, the display 322, and/or other components of the housing 112. In an example embodiment, the processors 324 may comprise one or more microprocessors, programmable logic controllers, and/or other like deices known in the art, and the processors 324 may be configured to control the various operations of the components operably connected thereto. Additionally, the memory may be used to store any number of functional components that are executable on the processors 324. In many embodiments, these functional components comprise instructions or programs that are executable by the processors 324 and that implement operational logic for performing the actions attributed above to the inductive charging system 110, such as selectively generating a magnetic field with the inductive charging coil 114. In addition, the memory may store various types of data that are referenced by executable programs.

Figure 4:
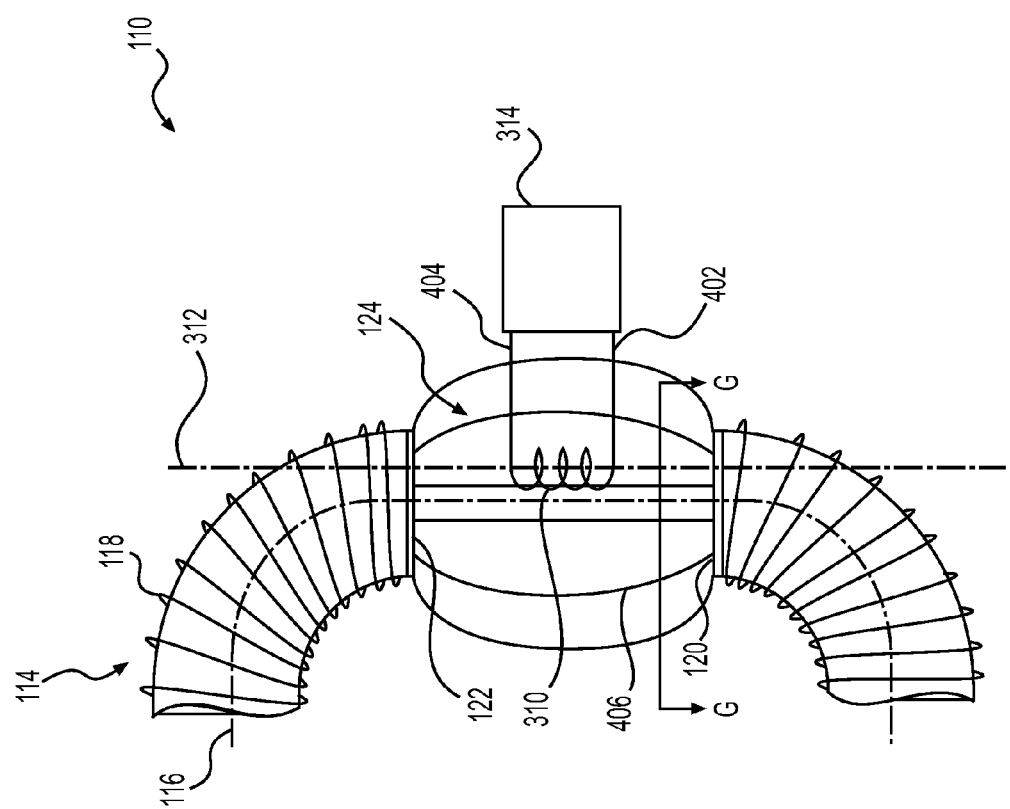
FIG. 4 illustrates an inductive charging coil of the inductive charging system shown in FIG. 1, and a secondary inductive coil of the electronic device shown in FIG. 3.

As shown in FIG. 4, the secondary inductive coil 310 may be electrically and/or otherwise operably connected to the rechargeable power supply 314 via first and second leads 402, 404. Accordingly, the secondary inductive coil 310 may direct power to the rechargeable power supply 314 via the first and second leads 402, 404 for recharging components thereof. Additionally, in an example embodiment the rechargeable power supply 314 may include one or more rectifiers, transformers, filters, and/or other known electrical components (not shown) configured to condition power directed from the secondary inductive coil 310 to the rechargeable power supply 314. Such electrical components may, for example, increase, decrease, amplify, and/or otherwise modify a current, frequency, voltage, and/or other characteristic of the power sent from the secondary inductive coil 310 to the rechargeable power supply 314. In such an embodiment, one or more such electrical components may be operably connected to the rechargeable power supply 314 via at least one of the leads 402, 404.

As noted above, disposing the electronic device 308 at least partially within the electromagnetic field generated by the charging coil 114 may induce electrical current in the secondary inductive coil 310, thereby charging the rechargeable power supply 314 of the electronic device 308. For instance, disposing the secondary inductive coil 310 substantially within the gap 124 may expose the secondary inductive coil 310 to flux of the electromagnetic field passing from the first end 120 the second end 122, and such flux is illustrated in FIG. 4 by flux lines 406. It is understood that such flux lines 406 may be illustrative of electromagnetic, RF, and/or other energy dissipated by and/or associated with the electromagnetic field generated within the gap 124. In example embodiments, some flux lines 406 may be substantially linear while other flux lines may be substantially curved between the first and second ends 120, 122. Further, positioning the electronic device 308 such that the longitudinal axis 312 of the secondary inductive coil 310 is substantially parallel to the flux lines 406 may maximize the efficiency with which energy dissipated by the electromagnetic field may be inductively transferred to the secondary inductive coil 310. In an example embodiment, it may be desirable to position the electronic device 308 in this way in order to minimize the time required to fully recharge the rechargeable power supply 314.

As noted herein, the inductive charging system 110 may be employed to recharge the rechargeable power supply 314 of an electronic device 308 utilizing near-field inductive charging techniques. The techniques described herein may be utilized with a variety of different electronic devices 308 known in the art, and advantageously, such techniques may facilitate wireless charging and/or recharging of power supplies associated therewith. For example, the electromagnetic field may be characterized by flux lines 406 sufficient to wirelessly charge and/or recharge any of the rechargeable power supplies 314 described herein. In such examples, the electromagnetic field may deliver up to approximately 5 Watts of energy at a frequency between approximately 3 KHz and approximately 3 GHz. In other example embodiments, the wattage and frequencies associated with the electromagnetic field may be greater than or less than those listed above. Additionally, inductive charging systems 110 of the present disclosure may be configured to minimize and/or substantially eliminate energy losses associated with known inductive charging systems. For example, the substantially annular inductive charging coil 114 described herein may be selectively energized to generate an electromagnetic field that is highly concentrated. In particular, inductive charging coils 114 of the present disclosure may generate such an electromagnetic field within a relatively small gap 124 extending from the first end 120 of the charging coil 114 to the second end 122. By focusing the electromagnetic field within such a relatively small area, energy losses may be minimized during techniques in which power is inductively transferred from the charging coil 114 to the secondary inductive coil 310 of the electronic device 308. Example first ends 120 of the charging coil 114, as seen from the perspective of section line G-G, are shown in greater detail in FIGS. 5 and 6.

Figure 5:
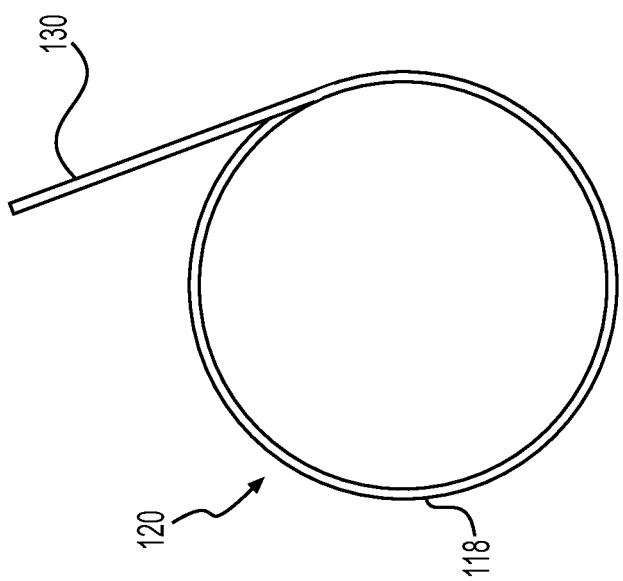
FIG. 5 illustrates a first end of an example inductive charging coil.

As shown in FIG. 5, and as noted herein, an example first end 120 of the charging coil 114 may be formed by the wire 118 wrapped in a spiral configuration and terminating at the lead 130. In the configuration of FIG. 5, the wire 118 may be wrapped tightly around an end of the core 126 (not shown) or, alternatively the core 126 may be omitted. Thus, in the configuration of FIG. 5, the first end 120 may comprise a substantially circular and/or substantially annular portion of the wire 118. In the embodiment of FIG. 5, the first end 120 formed by the wire 118 may be disposed substantially perpendicular to the central axis 116 (FIG. 1), and the first end 120 may be disposed substantially parallel to the second end (FIG. 1). It is understood that the second end 122 may have substantially the same configuration as the first end 120. Such a configuration may assist in focusing the electromagnetic field within the gap 124 (FIG. 1). Further, as noted herein, in some embodiments the first and second ends 120, 122 may not be formed by physical ends of the wire 118. Instead, in such embodiments, the wire 118 may form, for example, leads 130, 132, respectively, extending from the first and second ends 120, 122.

Figure 6:
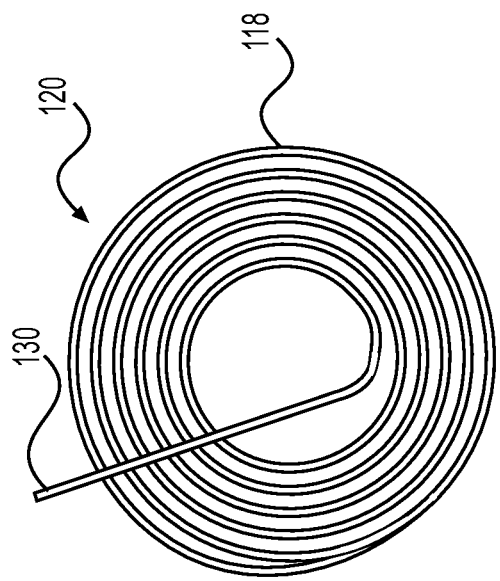
FIG. 6 illustrates a first end of an additional example inductive charging coil.

Alternatively, as shown in FIG. 6, the first end 120 of the charging coil 114 may be formed by the wire 118 wrapped in a spiral configuration and forming a substantially planar and/or substantially disc-shaped end of the charging coil 114. For example, the wire 118 may be wrapped substantially concentrically about the central axis 116 (FIG. 1) at the first end 120, and the lead 130 may extend from proximate the central axis 116. In the embodiment of FIG. 6, the first end 120 formed by the wire 118 may be disposed substantially perpendicular to the central axis 116, and the first end 120 may be disposed substantially parallel to the second end (FIG. 1). Although not shown in FIG. 6, it is understood that the second end 122 may have substantially the same configuration as the first end 120. Such a configuration may further assist in focusing the electromagnetic field within the gap 124 (FIG. 1). In still further embodiments, the configuration shown in FIG. 6 may be illustrative of a substantially conical first end 120. Such a substantially conical first end 120 may extend substantially along the central axis 116 (FIG. 1), such as in the direction of the Y-axis (FIG. 1). As noted above, the second end 122 may have substantially the same configuration as the first end 122.

Figure 7:
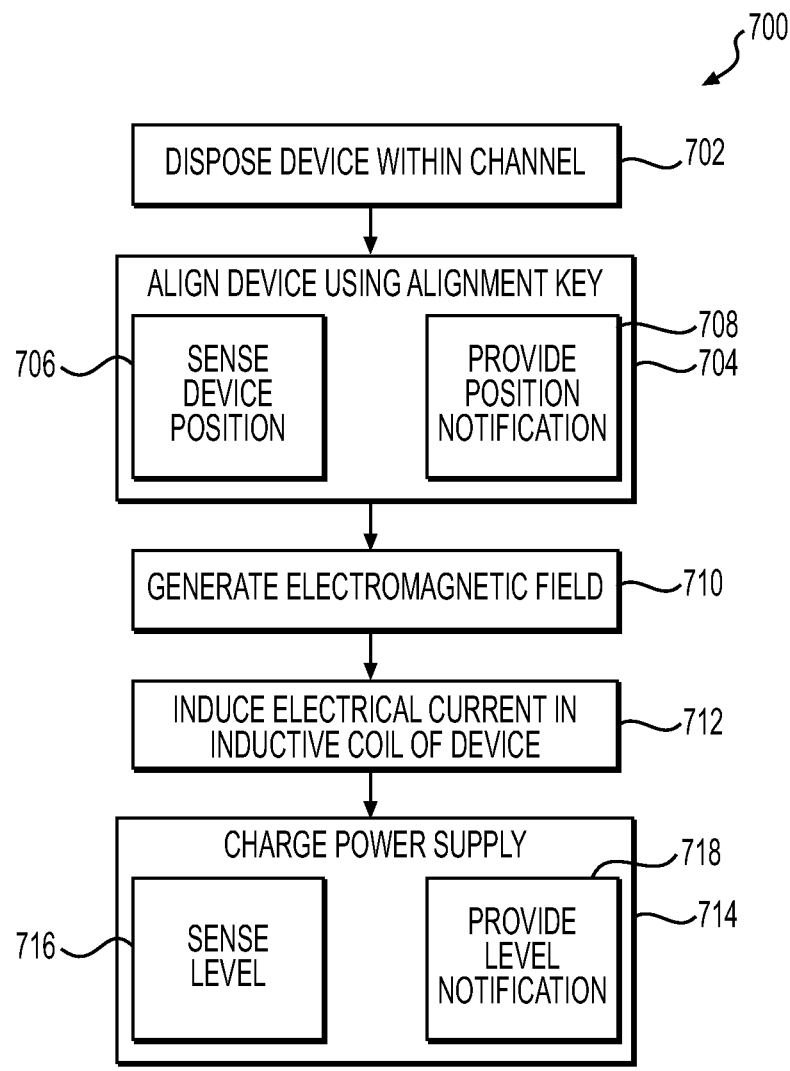
FIG. 7 is a flow chart illustrating an example method of the present disclosure.

FIG. 7 shows a flow chart 700 illustrating various aspects of an example method of inductively transferring power from the charging coil 114 to a secondary inductive coil 310 of an electronic device 308. It is understood that the operations illustrated in FIG. 7 may be performed in any order, and that example methods of the present disclosure may include more operations or fewer operations than those shown in the flow chart 700. For example, a method of inductively transferring power may include providing a housing 112 having an inductive charging coil 114 disposed therein. As noted above, an example housing 112 may include a channel 208 extending along an external length C thereof. Additionally, the charging coil 114 may include a substantially annular central axis 116 and a wire 118 wrapped in a spiral configuration circumferentially around the central axis 116. For example, a wire 118 may be wrapped circumferentially around a central core 126 of the charging coil 114. The charging coil 114 may include a first end 120 and a second end 122 disposed opposite and substantially facing the first end 120. In an example embodiment, the first and second ends 120, 122 may be formed by the wire 118. Alternatively, in an embodiment in which the charging coil 114 includes a central core 126, the first and second ends 120, 122 may comprise opposing faces or other surfaces of the core 126. Regardless, the charging coil 114 may be positioned such that the channel 208 formed by external surfaces and/or walls of the housing 112 may extend through a gap 124 formed by the charging coil 114.

In such an example method, an electronic device 308 in need of recharging may be disposed at least partially within the channel 208 of the housing 112 at step 702. In such an embodiment, the secondary inductive coil 310 of the electronic device 308 may be disposed substantially within the gap 124. For example, at step 704, the electronic device 308 may be aligned with one or more of the alignment keys 306 such that the longitudinal axis 312 of the secondary inductive coil 310 is disposed adjacent, substantially collinear with, and/or otherwise proximate the central axis 116 of the charging coil 114 within the gap 124.

Further, at step 706, one or more of the sensors 316 may sense a position of the electronic device 308 within the channel 208 and/or relative to the one or more alignment keys 306. At step 708, the sensors 316 and/or the display 322 may provide an indication, signal, alarm, and/or other notification to a user regarding the position of the electronic device 308 within the channel 208. For example, the sensors 316 and/or the display 322 may output visual and/or audible signal indicating when (i.e., in response to) the electronic device 308 has been properly aligned with one or more of the alignment keys 306.

In this way, components of the inductive charging system 110 may guide and/or otherwise assist the user in positioning the electronic device 308 in the channel 208 for charging. As a result, at steps 704-708 the electronic device 308 may be aligned with and/or otherwise proximate at least one of the alignment keys 306. For example, one or more corners, edges, and/or other structures of the electronic device 308 may be positioned aligned with, along, substantially parallel to, adjacent, abutting, and/or otherwise proximate alignment key 306 associated with a portion 304 of a first wall 202 of the housing 112. Disposing the electronic device 308 proximate the alignment key 306 in this way may dispose the secondary inductive coil 310 of the electronic device 308 substantially within an electromagnetic field generated by the inductive charging coil 114 and passing through the channel 208. For example, as noted above with respect to step 704, disposing the electronic device 308 at least partially within the channel 208 such that the electronic device 308 is disposed proximate the alignment key 306 may position the longitudinal axis 312 of the secondary inductive coil 310 substantially parallel to a portion of the central axis 116 of the charging coil 114 extending within the gap 124. In such embodiments, the longitudinal axis 312 may be disposed substantially tangent to and/or substantially collinear with the central axis 116 within the gap 124. Additionally, the longitudinal axis 312 may extend substantially parallel to flux lines 406 of the electromagnetic field extending from the first end 122 the second end 122 within the gap 24 when, for example, the electronic device 308 is disposed at least partially within the channel 208.

At step 710, electrical current may be directed to the charging coil 114 to generate an electromagnetic field within the gap 124. For example, electrical current may be directed to the charging coil 114 via a power source 128 operably connected to the charging coil 114 via the wire 118 and/or first and second leads 130, 132 associated with the wire 118. The electromagnetic field generated within the gap 124 may be highly-focused due to the relatively short height L of the gap 124 and, more generally, due to the substantially annular shape of the charging coil 114 itself. For example, generating an electromagnetic field within a gap 124 formed by a first end 120 of the charging coil 114 and a second end 122 substantially facing the first end 120 may substantially eliminate energy losses associated with known substantially linear charging coils in which a first end of the coil is disposed facing substantially away from a second end of the coil. Additionally, as described above with respect to FIGS. 5 and 6, the configuration of the first and second ends 120, 122 may further assist in focusing the electromagnetic field and substantially eliminating energy losses.

With the electronic device 308 disposed at least partially within the channel 208 such that the secondary inductive coil 310 is disposed proximate and/or substantially within the gap 124, the electromagnetic field generated by the charging coil 114 may induce electrical current in the secondary inductive coil 310 at step 712. Such current may pass to a rechargeable power supply 314 of the electronic device 308 operably connected to the secondary inductive coil 310, and this current may transmit energy to the rechargeable power supply 314. The power supply 314 may be charged by the transmitted energy at step 714.

In an example embodiment, the sensor 320 may monitor, measure, sense, detect, and/or otherwise determine the progress of charging the rechargeable power supply 314 at step 716. For example, the sensor 320 may, at step 716, determine the level of charge within the rechargeable power supply 314 before and/or while energy is transmitted to the rechargeable power supply 314 by the charging coil 114. The sensor 320 and/or the display 322 may output one or more level notifications and/or other like indicia of the charge level of the rechargeable power supply 314 at step 714. Such notifications may assist the user in determining when the charging of the rechargeable power supply 314 is complete. Further, such indicia may include one or more visual and/or audible signals as described above. For example, completion of the charging of the rechargeable power supply 314 may occur when the rechargeable power supply 314 is fully charged (i.e., when no additional energy can be stored by the rechargeable power supply 314). Alternatively, completion of the charging may occur when the rechargeable power supply 314 has been charged to between approximately 95 percent and approximately 100 percent of its storage capacity. In further embodiments, any other range of charge may be used to determine the completion of charging at step 714. Once complete, the electronic device 308 may be removed from the channel 208 and the charging coil 114 may be de-energized. For example, the processor 324 may de-energize the charging coil 114 in response to determining that the rechargeable power supply 314 has been substantially completely charged.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. An inductive charging system, comprising:
a housing including an internal portion, the housing further including a first wall, a second wall opposite the first wall, and a third wall extending from the first wall to the second wall, wherein:
the first wall, the second wall, and the third wall form a channel extending along an external length of the housing,
the first wall configured to support at least a portion of an electronic device thereon; and
an inductive charging coil disposed within the internal portion of the housing, the charging coil comprising a substantially annular central axis and a wire wrapped in a spiral configuration circumferentially around the central axis, the charging coil comprising:
a first end disposed within the internal portion and proximate the first wall; and
a second end substantially facing the first end, the second end being disposed within the internal portion and proximate the second wall, wherein the first end is spaced from the second end by a gap extending from the first end to the second end, the charging coil substantially surrounding at least a portion of the channel from within the housing such that the channel passes through the gap,
wherein a portion of the first wall comprises an alignment key indicative of a location of the first end of the coil relative to the first wall, and
wherein the charging coil is selectively energizeable to generate an electromagnetic field within the gap, the electromagnetic field being characterized by flux lines extending from the first end to the second end via the portion of the first wall.

2. The system of claim 1, wherein the charging coil comprises a central core, the wire being wrapped circumferentially around the core and the central axis extending substantially centrally through the core, and wherein the charging coil is operably connectable to a power source configured to direct electrical current to the charging coil.

3. The system of claim 2, wherein the power source is external to the housing.

4. The system of claim 1, wherein the housing comprises a shielding material configured to substantially prohibit magnetic forces from entering the housing, the first, second, and third walls being formed substantially without the shielding material.

5. The system of claim 1, further comprising: a first sensor disposed proximate the channel and configured to determine a position of a device within the channel, a second sensor operably connected to the charging coil and configured to determine an amount of current directed to the charging coil, and a processor operably connected to the first sensor and the second sensor.

6. The system of claim 1, further comprising a display configured to output content transmitted to the charging coil.

7. The system of claim 6, wherein the electronic device comprises a rechargeable power supply, and the output comprises indicia of a level of charge of the rechargeable power supply.

8. The system of claim 1, wherein the charging coil is positioned such that the third wall is disposed radially inward of the gap.

9. The system of claim 1, wherein the electronic device includes a secondary inductive coil having a longitudinal axis, and wherein aligning the electronic device with the alignment key disposes the longitudinal axis of the secondary inductive coil substantially collinear with the central axis within the gap.

10. The system of claim 1, further comprising a display configured to output content transmitted to the charging coil, a control operably connected to at least one of the charging coil or the display, and a processor operably connected to the display and the control.

11. A computer implemented method of inductively charging an electronic device, the method performed by a processor and including the operations of:
   determining the presence of an electronic device within a channel of a housing, wherein
      the housing includes an inductive charging coil disposed therein, a first wall, a second wall opposite the first wall, and a third wall extending from the first wall to the second wall,
      the channel extends along an external length of the housing, and is formed by the first wall, the second wall, and the third wall, and
      the charging coil comprises a substantially annular central axis, a wire wrapped circumferentially around the central axis, a first end, a second end substantially facing the first end, and a gap extending from the first end to the second end, the charging coil being positioned such that the channel extends through the gap;
   directing, in response to determining the presence of the electronic device, electrical current to the charging coil to generate an electromagnetic field within the gap, the electromagnetic field being characterized by flux lines extending from the first end to the second end via a portion of the first wall;
   inducing electrical current in a secondary inductive coil of the electronic device with the electromagnetic field; and
   charging a rechargeable power supply of the electronic device operably connected to the secondary inductive coil with the electrical current in the secondary inductive coil.

12. The method of claim 11, further comprising determining alignment of the electronic device with an alignment key of the channel, and outputting at least one of a visual signal or an audible signal indicative of the alignment, wherein aligning the electronic device with the alignment key disposes the secondary inductive coil of the electronic device within the electromagnetic field.

13. The method of claim 11, further comprising determining a level of charge within the rechargeable power supply, and outputting, via a display of the housing, indicia of the level of charge.

14. The method of claim 11, further comprising determining, with a sensor operably connected to the processor, that the rechargeable power supply has been completely charged by the electrical current, and de-energizing the charging coil in response to determining that the rechargeable power supply has been completely charged.

15. The method of claim 11, wherein:
   the charging coil comprises a central core, the wire being wrapped circumferentially around the core, and the central axis extending substantially centrally through the core,
   the first end comprises a first end of the core disposed proximate the first wall, and
   the second end comprises a second end of the core disposed proximate the second wall.

16. The method of claim 11, further comprising directing the electrical current to the charging coil from a power source operably connected to the charging coil and disposed external to the housing.

17. The method of claim 11, wherein:
   at least a portion of the housing includes a shielding material configured to substantially prohibit magnetic forces from exiting the housing, and
   at least part of the first wall and at least part of the second wall are configured without the shielding material such that the electromagnetic field may be generated within the gap.

18. The method of claim 12, further comprising determining a position of the electronic device within the channel using a sensor disposed proximate the channel, wherein the sensor is operably connected to the processor and is configured to provide a signal indicative of the position to the processor.

19. The method of claim 11, further comprising adjusting the amount of electrical current directed to the charging coil using a control operably connected to the charging coil.

\* \* \* \* \*